United States Patent
Watkins et al.

(10) Patent No.: US 8,501,850 B2
(45) Date of Patent: Aug. 6, 2013

(54) INDUCED POLYMER ASSEMBLIES

(75) Inventors: James J. Watkins, South Hadley, MA (US); Vikram K. Daga, Amherst, MA (US); Ying Lin, Amherst, MA (US)

(73) Assignee: University of Massachusetts, Boston, MA (US)

( * ) Notice: Subject to any disclaimer, the term of this patent is extended or adjusted under 35 U.S.C. 154(b) by 77 days.

(21) Appl. No.: 12/904,227

(22) Filed: Oct. 14, 2010

(65) Prior Publication Data

US 2011/0086985 A1 Apr. 14, 2011

Related U.S. Application Data

(60) Provisional application No. 61/251,600, filed on Oct. 14, 2009.

(51) Int. Cl.
*C08K 5/5415* (2006.01)

(52) U.S. Cl.
USPC ........... 524/267; 524/188; 524/242; 524/268; 524/329; 524/333; 524/424; 524/612; 977/737; 977/740; 977/753; 977/778; 977/783

(58) Field of Classification Search
None
See application file for complete search history.

(56) References Cited

PUBLICATIONS

"Synthesis and Self-assembly of Monodisperse Hybrid Polymer Nanoparticles" authored by Bai et al. and published in PMSE Preprints (2009) 101, 1488-1489.*

"Morphological Transformation of PS-b-PEO Diblock Copolymer by Selectively-Dispersed Colloidal CdS Quantum Dots" authored by Yeh et al. and published in Macromolecules (2003) 36, 7903-7907.*

"Responsive Assemblies: Gold Nanoparticles with Mixed Ligands iin Microphase-Separated Block Copolymers" authored by Li et al. and published in Adv. Mater. (2008) 20,1462-1466.*

The Self-Assembled Structure of the Di-Block Copolymer pCl-b-P4VP Transforms upon Competetive Interactions with Octaphenol Polyhedral Oligomeric Silsesquioxane authored by Lu et al. and published in Macromol. Rapid Commun. (2009) 30, 2121-2127.*

* cited by examiner

*Primary Examiner* — Marc Zimmer
(74) *Attorney, Agent, or Firm* — Milstein Zhang & Wu LLC

(57) ABSTRACT

The invention provides compositions and methods for inducing and enhancing order and nanostructures in block copolymers and surfactants by certain nonpolymeric additives, such as nanoparticles having an inorganic core and organic functional groups capable of hydrogen bonding. Various compositions having lattice order and nanostructures have been made from a variety of copolymers or surfactants that are mixed with nonpolymeric additives. Particularly, a variety of nanoparticles with an inorganic core and organic functional groups have been discovered to be effective in introducing or enhancing the degree of orders and nanostructures in diverse block copolymers and surfactants.

10 Claims, 12 Drawing Sheets

INDUCED POLYMER ASSEMBLIES

PRIORITY CLAIMS AND RELATED APPLICATIONS

This application claims the benefit of U.S. Provisional Application No. 61/251,600, filed Oct. 14, 2009, the entire content of which is expressly incorporated herein by reference.

GOVERNMENT RIGHTS

The United States Government has certain rights to the invention pursuant to Grant No. CMMI-0531171 from the National Science Foundation to the University of Massachusetts.

FIELD OF THE INVENTION

The invention generally relates to additives induced polymer assemblies. More particularly, the invention relates to compositions of ordered, nanostructured copolymer or surfactant assemblies induced by nonpolymeric additives, and related methods of making and use of same in various applications.

BACKGROUND OF THE INVENTION

Ordered and nanostructured materials can provide unique micro- and nano-structures and exceptional size-dependent properties. This class of materials may be tailored to provide materials for novel catalytic, sensors, membranes, structural, electric, magnetic, and biomaterials applications. Nanostructured materials often are used to refer to materials whose structural elements—clusters, crystallites or molecules—have dimensions in the 1 nm to about 100 nm range. Academic and industrial interests in these materials continue to rise as these materials exhibit remarkable variations in fundamental electrical, optical and magnetic properties that occur as one progresses from an "infinitely extended" solid to a particle of material consisting of a countable number of atoms.

An important class of nanostructured materials is block copolymers (BCPs). Some BCPs can spontaneously self-assemble to form nanoscale domains on a periodic lattice. (Bates, et al. *Physics Today* 1999, 52, 32; Leibler, *Macromolecules* 1980, 13, 1602; Bates, et al. *Annual Reviews Physical Chemistry* 1990, 41, 525.) For example, well ordered block copolymer thin films have been used as templates to pattern microelectronic devices and magnetic storage media, as sacrificial templates for the fabrication of inorganic mesostructured materials and for the preparation of polymeric nanoporous materials. (Park, et al. *Science* 1997, 276, 1401; Stoykovich, et al. *Materials Today* 2006, 9, 20; Harrison, et al. *Journal of Vacuum Science & Technology B* 1998, 16, 544; Jung, et al. *Nano Letters* 2008, 8, 3776; Cheng, et al. *Advanced Materials* 2001, 13, 1174; Park, et al., *Science* 2009, 323, 1030; Nagarajan, et al. *Advanced Materials* 2008, 20, 246; Pai, et al. *Science* 2004, 303, 507; Tirumala, et al. *Chemistry of Materials* 2007, 19, 5868; Hillmyer, in *Block Copolymers Ii*, Vol. 190, Springer-Verlag Berlin, Berlin 2005, 137; Kang, et al. *Macromolecules* 2009, 42, 455.) BCPs have also been used to direct the organization of hybrid materials, including polymer-nanoparticle composites. (Misner, et al. *Advanced Materials* 2003, 15, 221; Sohn, et al. *Acta Polym.* 1996, 47, 340.)

These materials have generated significant interest due to their potential in emerging areas such as photovoltaics and photonics. (Barber, et al. *Organic Electronics* 2006, 7, 508; Barran, et al. *Macromolecules* 2008, 41, 2701; Yang, et al. *J. Mater. Chem.* 2009, 19, 5416; Fink, et al. "Block copolymers as photonic bandgap materials", presented at *Workshop on Electromagnetic Crystal Structures*, Laguna Beach, Calif., Jan. 4-6, 1999; Urbas, et al. *Advanced Materials* 2000, 12, 812; Urbas, et al. *Macromolecules* 1999, 32, 4748.). A recent review describes the governing thermodynamic challenges for realizing well ordered polymer-nanoparticle hybrids. Among the technological challenges for implementing block copolymer directed assembly are the need to achieve well ordered systems at high additive loadings and the need to maintain acceptable costs. (Balazs, et al. *Science* 2006, 314, 1107.)

One approach to ordered hybrid materials begins with a strongly segregated block copolymer template. In the absence of kinetic limitations, the phase segregation of A-B and A-B-A diblock and triblock copolymers is thermodynamically governed by the product $\chi N$ where $\chi$ is the Flory-Huggins interaction parameter between the two dissimilar blocks and N is the total number of repeat units in all the blocks of the block copolymer. Upon segregation, the morphology is governed primarily by the relative volume fraction of the two blocks although the segregation strength of microphase segregated systems also plays a role near the phase boundaries. When segregation strength is high, A-B and A-B-A type block copolymers typically form spherical, cylindrical and lamellar morphologies as determined by their volume fractions. At lower segregation strengths in narrow ranges of volume fraction, bicontinuous gyroid morphologies can be observed. The phase segregation of A-B-A type triblock copolymers requires higher segregation strength (greater than about 18) as compared to diblock copolymer (greater than about 10.5). (Matsen, et al. *Journal of Chemical Physics* 1999, 111, 7139; Mayes, et al. *Journal of Chemical Physics* 1989, 91, 7228.)

Many applications would benefit from small domain sizes and, in the case of hybrid materials, high additive loadings. One challenge for achieving small domain sizes is that decreases in molar mass required to decrease the inter-domain spacing also weaken the segregation strength. It is often more desirable to increase the interaction parameter to maintain strong segregation. For hybrid materials, it is often desirable to maintain strong phase segregation and order upon the selective addition of additives to one domain of microphase segregated block copolymer templates. The amount of additives including nanoparticles that can be incorporated into BCPs is mostly limited to a few percent as higher loading of additives can disrupt the ordered BCP structure due to entropic penalties associated with polymer chain stretching required to accommodate the additives. (Balazs, et al. *Science* 2006, 314, 1107; Zhao, et al. *Journal of Chemical Physics* 2009, 130.) In other cases, either entropic considerations or lack of sufficient enthalpic interaction of the additives with the incorporating block have been associated with non-uniform distribution of particles within one phase. In addition, lack of sufficient interaction between the additive and the polymer chain can cause the additives to aggregate, which can lead to the loss of BCP order.

Novel, versatile additives effective in inducing and increasing order and nanostructures in polymeric materials and surfactants are strongly desired, particularly those that have unique physical and chemical attributes, as well as amendable to efficient and cost-effective production and application in various industries.

SUMMARY OF THE INVENTION

The invention is based in part on the unexpected discovery that orders and nanostructures may be induced or enhanced in block copolymer and surfactants by certain nonpolymeric additives, such as nanoparticles having an inorganic core and organic functional groups capable of hydrogen bonding.

In one aspect, the invention generally relates to a composition that includes: a block copolymer wherein a block comprises a hydrogen bond donor or a hydrogen bond acceptor; and a non-polymeric additive comprising an inorganic core and one or more organic functional groups that comprise a hydrogen bond acceptor or a hydrogen bond donor. The non-polymeric additive and the copolymer are associated by hydrogen bonds formed therebetween such that the resulting copolymer-additive composite exhibits an ordered nanostructured.

In some embodiments, the copolymer is disordered in the absence of the non-polymeric additive. In some other embodiments, the non-polymeric additive substantially enhances a somewhat ordered copolymer composite. That is the copolymer-additive composite exhibits stronger order than the copolymer in the absence of the additive.

The composition may include two or more block copolymers that have different monomer units. In some embodiments, the copolymer composition includes a block copolymer and a non-block copolymer. Preferred copolymers include tri-block copolymers.

The non-polymer additives of the invention are preferably inorganic materials with organic functional groups, such as nanoparticles functionalized thereon with groups capable of hydrogen-bonding. In some preferred embodiments, the non-polymer additive includes carbon nanotubes functionalized with organic groups capable of hydrogen bonding. In some other preferred embodiments, the non-polymer additive includes a fullerene functionalized with organic groups capable of hydrogen bonding. In yet other preferred embodiments, the non-polymer additive includes a poly(oligosilsesquioxane) functionalized with organic groups capable of hydrogen bonding.

In some embodiments, useful nanoparticles include those with a metal core and are functionalized with groups capable of forming hydrogen bonds with the copolymer, or those that have a metal oxide core and are functionalized with groups capable of forming hydrogen bonds with the copolymer. In some embodiments, the nanoparticles of a metal or metal oxide core are functionalized with a polymer or oligomer group that is capable of forming hydrogen bonds with the copolymer.

Each nanoparticle may include as many same or different functional groups capable of forming hydrogen bonds with the copolymer. In some embodiment, each nanoparticle has two or more same or different functional groups capable of forming hydrogen bonds with the copolymer. The preferred morphology of the composition also depends on the application and its nanostructure may include cylindrical, spherical or lamellar morphology.

In another aspect, the invention generally relates to a composition that includes: a surfactant wherein a segment block comprises a hydrogen bond donor or a hydrogen bond acceptor; and a non-polymeric additive comprising an inorganic core and one or more organic functional groups that comprise either a hydrogen bond acceptor or a hydrogen bond donor. The non-polymeric additive and the surfactant are associated by hydrogen bonds formed therebetween such that the surfactant-additive composite exhibits an ordered nanostructure.

In yet another embodiment, the invention generally relates to an ordered copolymer blend composition with periodic nanostructures, the copolymer blend being obtained in bulk quantity from a composition comprising a block copolymer and a non-polymeric additive. The non-polymeric additive comprising an inorganic core with a plurality of hydrogen bonding sites thereon capable of forming hydrogen bonding with the block copolymer.

In yet another aspect, the invention generally relates to a composition that includes a surfactant associated with a non-polymeric additive through hydrogen bonds, wherein the surfactant exhibits a substantially-ordered nanostructure having domain sizes from about 1 nm to about 30 nm, wherein the non-polymeric additive comprises an inorganic core. In some embodiments, the preferred domain sizes are from about 2 nm to about 20 nm. In some other embodiments, the preferred domain sizes are from about 2 nm to about 10 nm.

In yet another aspect, the invention generally relates to a method for introducing order into the morphology of a block copolymer composition. The method includes: providing a block copolymer melt, wherein the block copolymer having functional groups capable of forming hydrogen bonds; and adding to the block copolymer melt a non-polymeric additive, the additive comprising an inorganic core and one or more functional groups thereon that form hydrogen bonds with the block copolymer.

In yet another aspect, the invention generally relates to a method for increasing a nanostructure to a block copolymer composition. The method includes: providing a block copolymer melt, wherein the block copolymer having functional groups capable of forming hydrogen bonds; and adding to the block copolymer melt a non-polymeric additive, the additive comprising an inorganic core and one or more functional groups thereon that form hydrogen bonds with the block copolymer.

In yet another aspect, the invention generally relates to an article of manufacture that includes an ordered and nano-structured morphology of a composition which has a block copolymer or a surfactant and a non-polymeric additive. The ordered and nano-structured morphology results from hydrogen bonding between the block copolymer or the surfactant and the non-polymeric additive, and wherein the non-polymeric additive comprises an inorganic core and organic functional groups capable of hydrogen-bonding.

The article of manufacture may be, for example, a component of a photovoltaic system, a component of a battery system, a component of a photonics system, a component of a artificial membrane system, a component of a water purification system, a component of a fuel cell system, a component of a display system, a component of data storage system, a component of a resist system for device patterning, or a component of a flexible electronics system.

In yet another aspect, the invention generally relates to a composition that includes a block copolymer wherein a block comprises a hydrogen bond donor or a hydrogen bond acceptor; and a small molecule compound having one or more ring aromatic core scaffold functionalized with one or more hydrogen bond donor or acceptor groups, wherein the small molecule compound and the block copolymer are associated by hydrogen bonds formed therebetween so as to result in an ordered nanostructure.

In yet another aspect, the invention generally relates to a composition that includes a block copolymer wherein a block comprises a hydrogen bond donor or a hydrogen bond acceptor; and a fullerene compound or derivative functionalized with one or more hydrogen bond donor or acceptor groups, wherein the fullerene compound and the block copolymer are associated by hydrogen bonds formed therebetween so as to result in an ordered nanostructure. In some embodiments, the composition further comprises a non-polymeric additive comprising an inorganic core and one or more organic functional groups that comprise a hydrogen bond acceptor or a hydrogen bond donor.

In some embodiments, the composition includes a single a small molecule compound as additive having one or more ring aromatic core scaffold functionalized with one or more hydrogen bond donor or acceptor groups. In some other embodiments, the composition includes a single fullerene compound or derivative functionalized with one or more hydrogen bond donor or acceptor groups.

In some embodiments of the block copolymer compositions disclosed herein, the composition may include one or more blocks having one or more side chains and wherein the one or more side chains includes one or more of hydrogen bond donor or acceptor.

In some embodiments of the block copolymer compositions disclosed herein, the composition may include a first non-polymeric additive and a second non-polymeric additive, wherein the composition comprises a first microphase and a second microphase, and wherein substantially all of the first non-polymeric additive is present in the first microphase and substantially all of the second non-polymeric additive is present in the second microphase.

DETAILED DESCRIPTION OF THE INVENTION

The invention is based in part on the unexpected discovery that orders and nanostructures may be induced or enhanced in block copolymer and surfactants by certain nonpolymeric additives, such as nanoparticles having an inorganic core and organic functional groups capable of hydrogen bonding. Various compositions having lattice orders and nanostructures have been made from a variety of copolymers or surfactants that are mixed with nonpolymeric additives. Particularly, a variety of nanoparticles with an inorganic core and organic functional groups have been discovered to be effective in introducing or enhancing the degree of order and nanostructure in diverse block copolymers and surfactants.

Homopolymers may selectively associate through hydrogen bonding with the poly(ethylene oxide), or PEO, blocks of disordered Pluronic triblock copolymer surfactants (PEO-PPO-PEO) induces microphase segregation and strong order. (Tirumala, et al. *Chemistry of Materials* 2007, 19, 5868; Tirumala, et al. *Macromolecules* 2008, 41, 7978; Tirumala, et al. *Advanced Materials*. 2008, 20, 1603; *Advanced Materials* 2008, 9999, 1-6.) Phase segregation in the blends is driven by the attractive and repulsive interactions of the homopolymers additives including poly(acrylic acid), poly(4-vinyl phenol) and poly(styrene sulfonate) with PEO and poly(propylene oxide), or PPO, blocks respectively. The system assembles to maximize the energetically favorable interactions between PEO and the homopolymer which results in exclusion of PPO from the PEO/homopolymer domains and leads to formation of well ordered spherical, cylindrical and lamellar morphologies with domain sizes as small as 5.5 nm. Because these well ordered materials are constructed entirely of commodity homopolymers and readily available surfactants, they offer advantages to traditional block copolymers in terms of availabilities, scalability and cost.

Hydrogen bonding for mediating the interactions between polymers and additives is advantageous in part because the strength of such interactions may be controlled by the chemical identity and quantity of hydrogen bonding groups, temperature and the presence of other compounds such as protic solvents. Hydrogen bonding can be strong enough to overcome the tendency of random uncorrelated thermal motion of individual molecules and to offset the entropic penalty associated with the linear arrangement of molecules to form supramolecular polymeric chains.

Figure 1:
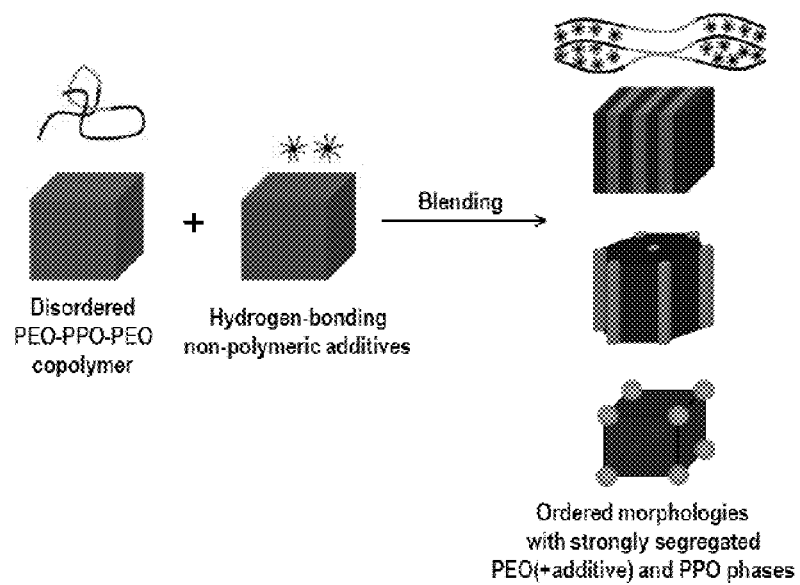
FIG. 1 shows a schematic representation of phase segregation of disordered Pluronic (PEO-PPO-PEO) surfactant caused by blending non-polymeric hydrogen-bonding additives.

The present invention demonstrates that non-polymeric additives that contain multiple hydrogen bonding sites such as phenol, carboxylic acid and amine groups at their periphery can effectively induce order in otherwise disordered surfactants resulting in the formation of well ordered materials (FIG. 1). FIG. 1 is a schematic representation of phase segregation of disordered Pluronic (PEO-PPO-PEO) surfactant caused by blending non-polymeric hydrogen-bonding additives. PEO and PPO are represented by blue and green chains respectively. Additives are represented by a black, non-interacting core (depending upon functionality desired for a particular application) and red hydrogen bonding ligands/ groups. When the blocks segregate to form lamellar, cylindrical and spherical morphologies, the additives enrich the PEO phase which is shown in purple.

For example, this strategy can be used to produce ordered materials at additive loading of more than 70%. In comparison to homopolymer additives, non-polymeric additives offer added structural, chemical and functional flexibility. For example, molecules with single aromatic or multi-ring aromatic and inorganic cores with a variety of chemical functionalities can be dispersed in the PEO phase. The availability of Pluronic surfactants with a wide range of relative volume fractions of PEO and PPO and the possibility of enriching them with additives having various physical and chemical attributes provides a generally applicable route to functional block copolymer templates.

Figure 2:
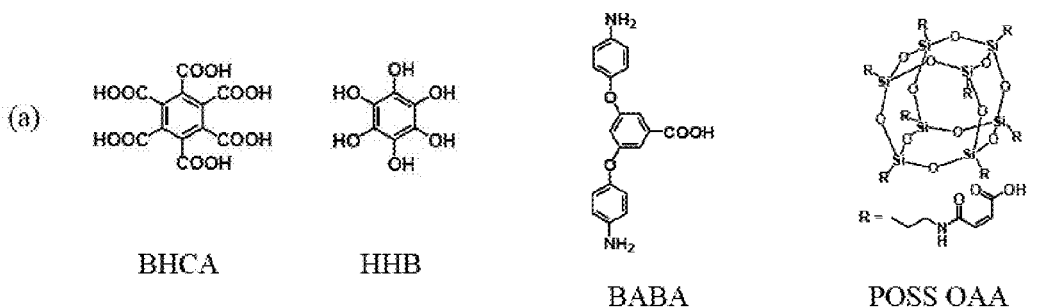
FIG. 2 shows exemplary non-polymeric additives with multipoint hydrogen bonding sites for polyethylene oxide and related data: (a) Non-polymeric additives with multipoint hydrogen bonding sites for polyethylene oxide: (i) benzene-1,2,3,4,5,6-hexacarboxylic acid (BHCA), (ii) benzene-1,2,3,4,5,6-hexyl (HHB), (iii) 3,5-Bis(4-aminophenoxy)benzoic acid (BABA) and (iv) POSS octa auric acid (POSS OAA). (b) SAXS profiles of F108 with BHCA, (c) SAXS profiles of F108 with HHB and BABA, (d) SAXS profiles of F108 with POSS OAA, (e) SAXS profiles of F88, F68 and P108 with 50% POSS OAA. All measurements were carried out at 80° C. The recorded data was shifted vertically for clarity.
Figure 2:
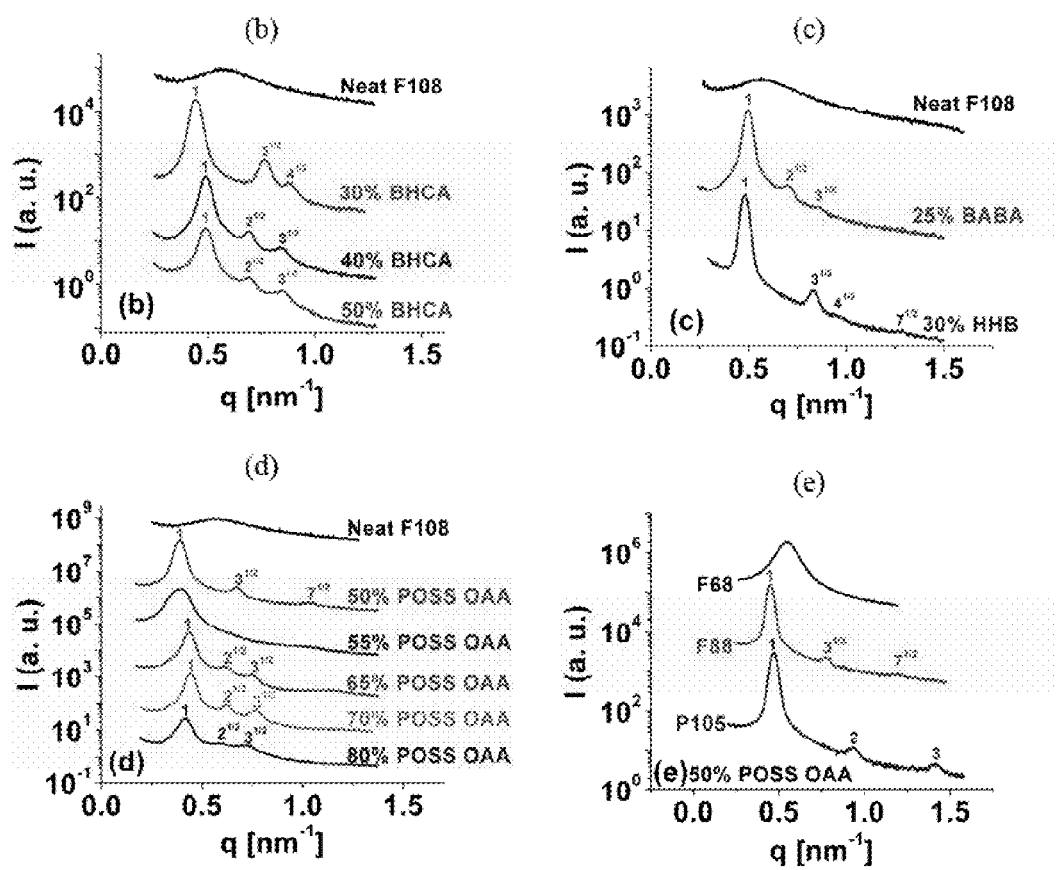

Exemplary molecular additives that have been successfully incorporated into Pluronic surfactant, F108, are shown in FIG. 2a. The phase behavior of Pluronic surfactants is influenced by the identities of the hydrogen bonding groups on the additives and of the non-interacting cores at progressive additive loadings. The phase behavior of all blends was determined at 80° C. using small angle x-ray scattering (SAXS). A 30 minute equilibration time at 80° C. was employed before the measurements to ensure melting of any PEO crystallites and thus observe equilibrium block copolymer morphologies.

FIG. 2b shows the scattering profiles for blends of F108 and BHCA blends at varying compositions. In contrast to the behavior observed by 1-propanoic acid, a small molecule which was found incapable to induce phase segregation in Pluronic surfactants, BHCA is able to phase segregate F108 resulting in formation of well ordered morphologies (indicated by the sharpening of first peak and appearance of multiple higher order reflections). Since F108 is PEO rich, PEO forms the matrix whereas PPO forms the domains in the ordered F108 templates. At 30% loading of BHCA the scattering peak positions were found to be 0.440, 0.756, 0.884, and 1.167 $nm^{-1}$ indicating the formation of cylindrical morphology with a domain spacing of 14.2 nm. Upon increasing the composition of BHCA to 40% and 50%, spherical morphology was formed as indicated by the peak positions of 0.489, 0.688, and 0.842 $nm^{-1}$ for 40% loading and 0.489, 0.692, and 0.846 $nm^{-1}$ for 50% loading. Thus, in comparison with 1-propanoic acid, the ability of BHCA to induce phase segregation may be linked to its multi-point interaction sites (carboxylic acid groups) which enable better physical linking with PEO phase. In addition to the multipoint interaction, the strength of each interaction can play a role in the ordering of Pluronic surfactants. The domain spacing of the exemplary blend systems ranged between about 13 to 16 nm. Table 1 summarizes exemplary domain spacings and morphologies of the blends studied herein.

FIG. 2c compares the scattering profiles of 30% blend of benzene-1,2,3,4,5,6-hexyl with F108 and 25% blend of 3,5-Bis(4-amino-phenoxy)-benzoic acid with F108. As in the case of BHCA at a similar loading, 30% benzene-1,2,3,4,5, 6-hexyl induced formation of cylindrical morphology. However, 3,5-Bis(4-amino-phenoxy)-benzoic acid induced the formation of spherical morphology at only 25% loading. The induced ordering upon addition of 3,5-Bis(4-amino-phenoxy)-benzoic acid demonstrates the feasibility of selective incorporation of bifunctional additives into Pluronic templates. Such simple blending strategies may be used to selectively incorporate multiple chemical functionalities in block copolymer templates and this provide new access routes to phase selective reactions.

The size of the additive core has an effect on the phase behavior of blends of F108 with polyhedral oligomeric silsesquioxane (POSS). The results are shown in FIG. 2d. Interestingly, POSS cages, which are about 1 nm in diameter, were incorporated into the PEO phase resulting in formation of well ordered morphologies. At 50% loading POSS OAA formed cylindrical morphology with F108 with a domain spacing of about 16 nm. Upon increasing the loading of POSS OAA to 55%, well-defined structure factor peaks disappeared implying an ill-defined morphology as an order-order transition from cylindrical to spherical morphologies is traversed. At 65% loading the structure of the blend transitioned into a well ordered spherical morphology with a domain spacing of 14.5 nm. This reduction in domain spacing from 16 nm to 14.5 nm may be attributed to the transition from cylindrical to spherical morphology. The spherical morphology persisted at 70% loading but at 80% loading, the peaks began to broaden implying a weakening of order. Since POSS OAA can be incorporated at higher loadings as compared to other additives, a larger swelling of PEO matrix is observed resulting in larger PPO domain spacing.

The weight of the POSS cage is about 26% of the entire POSS OAA molecule and therefore a loading of 70% POSS OAA into F108 translates to about 18% loading of the inorganic cores. Suitable chemical functionalities can lead to high levels of incorporation of additives thereby significantly altering the properties of the host polymer. This has particularly significant utility in light of the vast literature which suggests that the entropic penalty associated with polymer chain stretching around the additives tends to cause macrophase separation of the additive from the polymer and thus sets a limit to the maximum loading.

Figure 3:
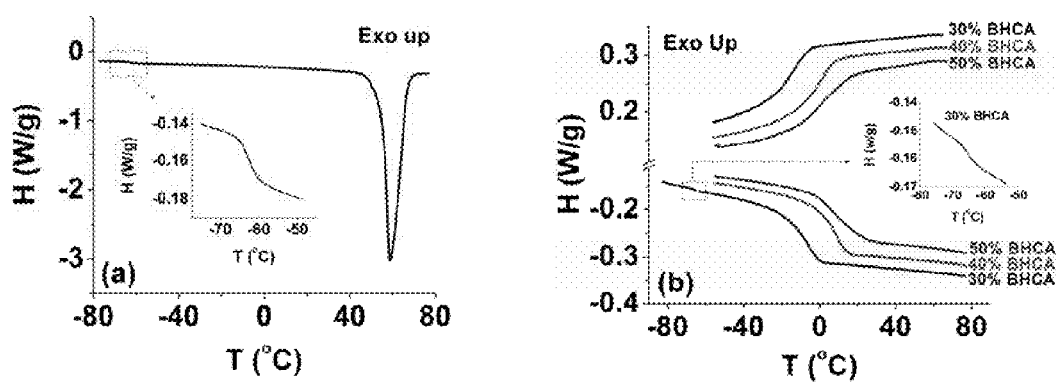
FIG. 3 shows exemplary heating and cooling DSC thermograms of (a) neat F108 and (b) blends of F108 with benzene-1,2,3,4,5,6-hexacarboxylic acid (BHCA) at 30%, 40% and 50% loading.
Figure 5:
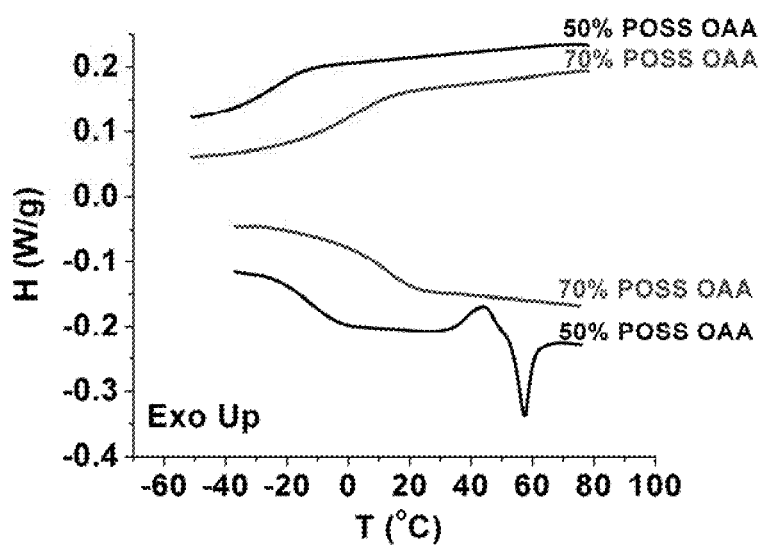
FIG. 5 shows exemplary heating and cooling DSC thermograms of blends of F108 with POSS octa amic acid (POSS OAA) at 50% and 70% loading.

DSC of blends of BHCA with F108 was performed. The DSC thermogram of neat F108 in the second heating step is shown in FIG. 3a. Neat F108 is disordered and therefore a single $T_g$ was observed at −62.4° C. A melting endotherm associated with melting of PEO crystallites was observed at 58.8° C. with a melting enthalpy of 131.5 J $g^{-1}$. FIG. 3b shows the DSC thermograms of blends of F108 with BHCA recorded in the second heating and cooling steps. At 30% loading of BHCA, PEO and PPO formed separate phases and a dramatic increase in $T_g$ of PEO −14.0° C. occurred. A second $T_g$ at −65.7° C. was observed which can be attributed to the phase segregated PPO domains. An increase in the $T_g$ of PEO is expected because of a slowdown in cooperative mobility as a result of physical binding of PEO segments with BHCA. As the loading of BHCA increased to 40% and 50% the $T_g$'s increased to 0.9° C. and 1.17° C., respectively. In addition, as a result of interactions with PEO, at the compositions explored, BHCA quenched the crystallization of PEO completely and no crystallite melting transition was observed as in the case of neat F108. An increase in $T_g$ of PEO and suppression of crystallization of PEO implies that the additives are intimately mixed with the PEO phase. Similar trends of increase in $T_g$ and suppression of crystallization of PEO were observed for the case of blends of POSS OAA and F108 as shown in FIG. 5.

Figure 4:
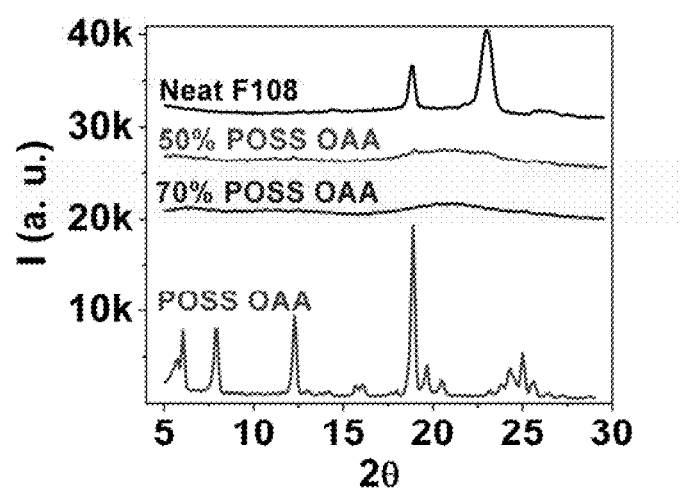
FIG. 4 shows exemplary X-ray diffraction profiles of neat F108 and its blend with POSS octa amic acid (POSS OAA) at 50% and 70% loading.

The molecular mixing of POSS OAA with PEO phase of F108 was also observed using X-ray diffraction (XRD) at high angles. FIG. 4 shows the XRD profiles of F108-POSS OAA blends as a function of the composition of POSS OAA. As POSS OAA was added to F108, the peaks of neat F108 that appear from PEO crystallites and the peaks of neat POSS OAA decreased in intensity and disappear completely at 70% loading. (Mihailov, et al. *Acta Polym.* 1985, 36, 481.) This implies that POSS OAA is well dispersed in the PEO phase of F108 such that the crystallization of both is suppressed.

Thus, when sufficient amount of additives that are capable of interacting with PEO are added, in addition to the phase segregation to form ordered morphologies, the crystallization of PEO is quenched and the $T_g$ of the PEO matrix rises by as high as about 60° C. With such improvements in properties of these blends, polymer electrolyte applications may benefit by employing some of the exemplary blend systems studied herein. For example, significant efforts have been made to reduce the crystallanity of PEO thereby increasing its ionic conductivity by incorporation of salts and nanofillers (Kumar, et al. *Journal of the Electrochemical Society* 2001, 148, A1336; Kumar, et al. *Electrochimica Acta* 2002, 47, 4125; Kumar, et al. *Journal of the Electrochemical Society* 2001, 148, A1191; Nookala, B. Kumar, S. Rodrigues, *Journal of Power Sources* 2002, 111, 165.)

In addition, the need for high mechanical stability has been addressed by employing PEO containing BCPs in which the other block provides the necessary mechanical strength as well as constraints by which the ion conduction paths become well-defined. (Gomez, et al. *Nano Letters* 2009, 9, 1212; Panday, et al. *Macromolecules* 2009, 42, 4632.) The blends of POSS OAA and BHCA with F108 are solid-like even at 80° C. and therefore may be mechanically stable enough for polymer electrolyte applications such as rechargeable batteries.

More generally, the present invention enables an approach for producing ordered hybrid materials, including block copolymer systems, for example, for use as lithographic resists. The selective incorporation of high loadings of etch resistant additives in one domain while maintaining the block copolymer morphology, for example, provides a method of enhancing the etch contrast between different phases of the block copolymer template.

This invention is generally applicable over other Pluronic surfactants. For example, POSS OAA was blended at 50% loading with other Pluronic surfactants, namely, F88 (PEO$_{109}$-PPO$_{41}$-PEO$_{109}$, 12 kg mol$^{-1}$), F68 (PEO$_{82}$-PPO$_{31}$-PEO$_{82}$, 9 kg mol$^{-1}$) and P105 (PEO$_{34}$—PPO$_{52}$-PEO$_{34}$, 6 kg mol$^{-1}$) and the resulting scattering profiles of the blends obtained are shown in FIG. 2e. Both F88 and F68 contain 80% PEO like F108 and therefore the effect of changing N can be observed by comparing the behavior of F108, F88 and F68. At 50% loading of POSS-OAA F88 forms cylindrical morphology as is the case with F108 although at a slightly smaller domain spacing of 14 nm. In the case of F68, the scattering profile had a broad first peak without any higher order peaks indicating that the segregation of F68 was not sufficient to form ordered morphology. P105, which is close to symmetric in terms of relative volume ratio of PEO and PPO, formed lamellar morphology as indicated by the SAXS profile with peak positions of 0.468, 0.933, and 1.411 nm$^{-1}$. Even though the molecular weight of P105 is less than that of F68, P105 blends formed a well ordered morphology due to the symmetric volume ratio of the PEO and PPO blocks, which requires smaller segregation strength ($\chi N$) to microphase segregate and order.

Incorporation of non-polymeric additives that bear hydrogen bonding sites for PEO at multiple locations, therefore, can induce order in otherwise disordered Pluronic surfactants due to the formation of supramolecular association with PEO chains resulting in segregation of PEO and PPO blocks to form well ordered morphologies. Importantly, if the chemical functionality is designed correctly, additives with large core volumes such as POSS OAA can be incorporated into the block copolymer template at high loadings (over 70% w/w). With increasing amount of additives blends with F108 were shown to undergo transition from cylindrical to spherical morphology. The effect of reduction of chain length N was observed by comparing the behavior of F108 with F88 and F68, the latter of which was found to be at the limit of phase segregation for Pluronic surfactants with 80% PEO. P105 was shown to provide access to lamellar morphology.

Non-polymeric additives provide notable advantages over polymeric additives. As compared to polymeric additives such as poly(acrylic acid), non-polymeric additives allows for selective incorporation of a wider range of chemical and physical attributes within the block copolymer templates because of a wider range of possible choices. Since the additives, are incorporated selectively within the PEO phase, contrast in the physical and chemical properties between PEO and PPO phases can be increased significantly especially at high additive loading. High contrast coupled with formation of small and well ordered domains make these systems potential candidates for applications that rely on the differences in physicochemical properties between the domains and the matrix of block copolymer template for example block copolymer lithography, fabrication of photonic materials, and phase selective chemistries. In addition, selective chemical functionalization of PEO phase may offer avenues in phase selective reactions.

The benefit of using additives to modify the base block copolymer has the advantage that specialty block copolymers need not be synthesized at different molecular weights and volume fractions. For example, Pluronic surfactants may be highly loaded with POSS molecules to access different morphologies without any need for incorporation of POSS on the backbone of one of the blocks through tedious synthetic methods. Since the additives are selectively sequestered into PEO phase, the properties of PEO phase can be tailored by the kind of additives without any changes in the block copolymer.

The ability to incorporate high loadings of POSS serves as an example of an easy route to form highly loaded and microstructured polymer nanocomposites. Since the interaction between the additives and PEO is due to hydrogen bonding, the additives shown are expected to find applications in other PEO containing copolymers.

Thus, in one aspect, the invention generally relates to a composition that includes: a block copolymer wherein a block comprises a hydrogen bond donor or a hydrogen bond acceptor; and a non-polymeric additive comprising an inorganic core and one or more organic functional groups that comprise a hydrogen bond acceptor or a hydrogen bond donor. The non-polymeric additive and the copolymer are associated by hydrogen bonds formed therebetween such that the resulting copolymer-additive composite exhibits an ordered nanostructure.

In some embodiments, the copolymer is disordered in the absence of the non-polymeric additive. In some other embodiments, the non-polymeric additive enhances a somewhat ordered copolymer composite. That is the copolymer-additive composite exhibits stronger order than the copolymer in the absence of the additive.

The composition may include a copolymer having two or more blocks that have different monomer units. In some embodiments, the copolymer composition includes a block copolymer and a non-block copolymer. Preferred copolymers include tri-block copolymers.

Exemplary blocks or segments of useful copolymers include a poly(propylene oxide) block, a poly(ethylene oxide) block. Exemplary copolymers that may be used include Pluronic surfactants.

The non-polymer additives of the invention are preferably inorganic materials with organic functional groups, such as nanoparticles functionalized thereon with groups capable of hydrogen-bonding.

In some preferred embodiments, the non-polymer additive includes carbon nanotubes functionalized with organic groups capable of hydrogen bonding. In some other preferred embodiments, the non-polymer additive includes a fullerene functionalized with organic groups capable of hydrogen bonding. In yet other preferred embodiments, the non-polymer additive includes a poly(oligosilsesquioxane) functionalized with organic groups capable of hydrogen bonding.

Fullerenes are molecules composed of carbon, in the form of a hollow sphere, ellipsoid, or tube. Spherical fullerenes are also called buckyballs, and cylindrical ones are called carbon nanotubes or buckytubes. Examples of fullerenes include: buckyball clusters such as C20 (unsaturated version of dodecahedrane) and C60 (buckminsterfullerene); nanotubes which are hollow tubes having single or multiple walls.

Selection of functional groups and methods for introducing such functionalities to nanoparticles may be accomplished according to any methods known or heretofore developed. The key is to provide the additives and the copolymers or surfactants the appropriately matched hydrogen bond donors and acceptor such that the resulting composite exhibit the desired order and nanostructure. (See, e.g., "Chemistry of Carbon Nanotubes" Tasis, et al. *Chem. Rev.* 2006, 106 (3), 1105-1136.)

The term "inorganic", as used herein, refers to compounds and materials that are not small or polymeric organic molecules and include, for example, conventional inorganic compounds as well as compounds and materials that have a core of C-, Si-metal-, or oxides thereof or their mixtures.

Examples of nanoparticles include those with a Si core and are functionalized with groups capable of forming hydrogen bonds with the copolymer, nanoparticles with a CdS core and are functionalized with groups capable of forming hydrogen bonds with the copolymer.

In some embodiments, useful nanoparticles include those with a metal core and are functionalized with groups capable of forming hydrogen bonds with the copolymer, or those that have a metal oxide core and are functionalized with groups capable of forming hydrogen bonds with the copolymer. In some embodiments, the nanoparticles of a metal or metal oxide core are functionalized with a polymer or oligomer group that is capable of forming hydrogen bonds with the copolymer.

The preferred size of the nanoparticles depends on the application. Typically, nanoparticles have a size from about 1 nm to about 30 nm, for example, from about 1 nm to about 20 nm, from about 1 nm to about 20 nm, from about 5 to about 20 nm, or from about 1 nm to about 15 nm. In some embodiments, the preferred size of nanotubes (e.g., carbon nanotubes) have a diameter from about 1 nm to about 30 nm, for example, from about 1 nm to about 20 nm, from about 1 nm to about 20 nm, from about 5 to about 20 nm, or from about 1 nm to about 15 nm. In some embodiments, the preferred size of nanorods (e.g., carbon nanorods) have a diameter from about 1 nm to about 30 nm, for example, from about 1 nm to about 20 nm, from about 1 nm to about 20 nm, from about 5 to about 20 nm, or from about 1 nm to about 15 nm.

Each nanoparticle may include as many same or different functional groups capable of forming hydrogen bonds with the copolymer. In some embodiment, each nanoparticle has two or more same or different functional groups capable of forming hydrogen bonds with the copolymer. The selection of functional groups depends on the application at hand and may include such functional groups as amino, phenol or carboxylic acid groups. In some embodiments, each additive molecule includes two carboxylic acid groups.

The preferred morphology of the composition also depends on the application and its nanostructure may include cylindrical, spherical or lamellar morphology. The nanostructural domain of the composition may have a size from about 1 nm to about 30 nm, for example, from about 2 nm to about 20 nm, from about 2 nm to about 15 nm.

The composition of copolymer and additive may have various loadings, for example, from about 5% (w/w) to about 80% (w/w).

In another aspect, the invention generally relates to a composition that includes: a surfactant wherein a segment block comprises a hydrogen bond donor or a hydrogen bond acceptor; and a non-polymeric additive comprising an inorganic core and one or more organic functional groups that comprise either a hydrogen bond acceptor or a hydrogen bond donor. The non-polymeric additive and the surfactant are associated by hydrogen bonds formed therebetween such that the surfactant-additive composite exhibits an ordered nanostructure.

It is noted here that "copolymer" and "surfactant", as used herein, are distinctive but overlapping terms as certain surfactants are copolymers by structural nature and certain copolymers are surfactants by functionality. The discussion herein referring to copolymer or surfactant is generally applicable vice versa.

In yet another embodiment, the invention generally relates to an ordered copolymer blend composition with periodic nanostructures, the copolymer blend being obtained in bulk quantity from a composition comprising a block copolymer and a non-polymeric additive. The non-polymeric additive comprising an inorganic core with a plurality of hydrogen bonding sites thereon capable of forming hydrogen bonding with the block copolymer.

In yet another aspect, the invention generally relates to a composition that includes a surfactant associated with a non-polymeric additive through hydrogen bonds, wherein the surfactant exhibits a substantially-ordered nanostructure having domain sizes from about 1 nm to about 30 nm, wherein the non-polymeric additive comprises an inorganic core. In some embodiments, the preferred domain sizes are from about 2 nm to about 20 nm. In some other embodiments, the preferred domain sizes are from about 2 nm to about 10 nm.

In yet another aspect, the invention generally relates to a method for introducing order into the morphology of a block copolymer composition. The method includes: providing a block copolymer melt, wherein the block copolymer having functional groups capable of forming hydrogen bonds; and adding to the block copolymer melt a non-polymeric additive, the additive comprising an inorganic core and one or more functional groups thereon that form hydrogen bonds with the block copolymer.

In yet another aspect, the invention generally relates to a method for increasing a nanostructure to a block copolymer composition. The method includes: providing a block copolymer melt, wherein the block copolymer having functional groups capable of forming hydrogen bonds; and adding to the block copolymer melt a non-polymeric additive, the additive comprising an inorganic core and one or more functional groups thereon that form hydrogen bonds with the block copolymer.

In yet another aspect, the invention generally relates to an article of manufacture that includes an ordered and nano-structured morphology of a composition which has a block copolymer or a surfactant and a non-polymeric additive. The ordered and nano-structured morphology results from hydrogen bonding between the block copolymer or the surfactant and the non-polymeric additive, and wherein the non-polymeric additive comprises an inorganic core and organic functional groups capable of hydrogen-bonding.

The article of manufacture may be, for example, a component of a photovoltaic system, a component of a battery system, a component of a photonics system, a component of a artificial membrane system, a component of a water purification system, a component of a fuel cell system, a component of a display system, a component of data storage system, a component of a resist system for device patterning, or a component of a flexible electronics system.

In yet another aspect, the invention generally relates to a composition that includes a block copolymer wherein a block comprises a hydrogen bond donor or a hydrogen bond acceptor; and a small molecule compound having one or more ring aromatic core scaffold functionalized with one or more hydrogen bond donor or acceptor groups, wherein the small molecule compound and the block copolymer are associated by hydrogen bonds formed therebetween so as to result in an ordered nanostructure.

In yet another aspect, the invention generally relates to a composition that includes a block copolymer wherein a block comprises a hydrogen bond donor or a hydrogen bond acceptor; and a fullerene compound or derivative functionalized with one or more hydrogen bond donor or acceptor groups, wherein the fullerene compound and the block copolymer are associated by hydrogen bonds formed therebetween so as to result in an ordered nanostructure. In some embodiments, the composition further comprises a non-polymeric additive comprising an inorganic core and one or more organic functional groups that comprise a hydrogen bond acceptor or a hydrogen bond donor.

In some embodiments, the composition includes a single a small molecule compound as additive having one or more ring aromatic core scaffold functionalized with one or more hydrogen bond donor or acceptor groups. In some other embodiments, the composition includes a single fullerene compound or derivative functionalized with one or more hydrogen bond donor or acceptor groups.

In some embodiments of the block copolymer compositions disclosed herein, the composition may include one or more blocks having one or more side chains and wherein the one or more side chains includes one or more of hydrogen bond donor or acceptor.

In some embodiments of the block copolymer compositions disclosed herein, the composition may include a first non-polymeric additive and a second non-polymeric additive, wherein the composition comprises a first microphase and a second microphase, and wherein substantially all of the first non-polymeric additive is present in the first microphase and substantially all of the second non-polymeric additive is present in the second microphase.

EXAMPLES

Materials: Commercially available commodity surfactant, Pluronic copolymer F108 ($PEO_{127}$-$PO_{48}$-$EO_{127}$, 14.6 kg $mol^{-1}$) containing about 80% PEO and was donated by BASF. Using gel permeation chromatography the polydispersity index of F108 was found to be 1.18. Benzene-1,2,3,4,5,6-hexacarboxylic acid (BHCA, $M_w$=342 g $mol^{-1}$), 3,5-Bis(4-amino-phenoxy)-benzoic acid ($M_w$=336 g $mol^{-1}$), and benzene-1,2,3,4,5,6-hexyl ($M_w$=174 g $mol^{-1}$) were purchased from TCI America. Polyhedral oligomeric silsesquioxane (POSS) octa amic acid (POSS OAA, $M_w$=1592 g $mol^{-1}$) was purchased from Hybrid Plastics. N,N-Dimethylformamide (DMF) and water were purchased from Fisher Scientific. All the materials and solvents were used as received.

Sample Preparation: Known masses of the Pluronic surfactants additives were dissolved in DMF to form 10 wt. % solution. In the case of BHCA a 50:50 water-DMF mixture was used instead of DMF. The solutions were kept on a hot plate at 65° C. for about two hours and stirred to form homogenous solutions. The solutions were then transferred to a vacuum oven maintained at 75° C. for 24 to 36 hours during which drying and annealing occurred. Solvent mass losses were tracked to confirm that the resulting samples did not contain any residual solvent. Here, compositions are reported as absolute weight percentages. For example, a blend with 30% additive contained 3 g of additive for 7 g of the Pluronic surfactant.

Small-Angle X-ray Scattering: The dried samples were placed in the center of 1 mm thick metal washers and sealed on both sides with kapton film. The filled metal washers were put in metal cells that fit on a vertical heater installed inside the sample chamber and heated to 80° C. Small angle x-ray scattering (SAXS) was performed on an in-house setup from Molecular Metrology Inc. (presently sold as Rigaku S-Max3000). It uses a 30 W microsource (Bede) with a 30×30 $\mu m^2$ spot size matched to a Maxflux® optical system (Osmic) leading to a low-divergence beam of monochromatic $CuK_\alpha$ radiation (wavelength $\lambda$=0.1542 nm). The beam size as it impinges on the sample is 0.4 mm diameter. The whole system is evacuated during operation. The sample to detector distance was calibrated using silver behenate standard peak at 1.076 $nm^{-1}$. This allows measurements in wave vector (q) range of 0.06<q<1.6 $nm^{-1}$ in which q=($4\pi/\lambda$)sin θ, where 2θ is the scattering angle. A two-dimensional gas-filled wire detector was used for collection of scattered x-ray. The raw scattering data was circularly averaged and plotted as intensity vs. q where intensity was used in arbitrary units.

Differential Scanning calorimetry: Differential scanning calorimetry (DSC) was carried out to confirm the blending of additives and the nature of their interaction with PEO phase of F108. The blends prepared for SAXS were used for DSC to obtain a complementary set of results. Sample mass of 10 to 15 mg were filled in hermetically sealed aluminum pans and DSC thermograms were measured on a TA instrument Q100 DSC equipped with an RCS cooling system and nitrogen gas purge with a flow rate of 50 mL $min^{-1}$. All measurements were conducted in the temperature range of −90° C. to 80° C. at a constant heating and cooling rate of 10° C. $min^{-1}$ under nitrogen atmosphere. The temperature calibration was carried out using Indium as a standard ($T_m$=156.6° C.) and the Indium heat of fusion (28.6 J $g^{-1}$) was used to calibrate the heat flow.

X-Ray Diffraction: Solutions of neat F108, neat POSS OAA and their blends were prepared in DMF at 10% total solids concentration. These solutions were drop casted on glass slides and dried in vacuum oven for 36 hours. These samples were kept at room temperature for about 30 to 45 minutes and XRD was performed in the 2theta range of 5 to 35 degrees at room temperature using PANalytical x-ray diffraction system with divergence slit of ⅟₁₆" and X'Celerator detector.

FIG. 5 shows the DSC thermograms of blends of F108 with POSS OAA. Upon addition of 50% and 70% POSS OAA into F108, the $T_g$ increased to −24.4° C. and 2.16° C. respectively. A 70% loading of POSS OAA into F108 caused complete quenching of PEO crystallization as indicated by absence of the PEO inciting peak. The heating thermogram of the 50% POSS OAA sample showed melting accompanied by molecular reorganization as indicated by the shoulder before the melting peak. Integrating over the shoulder and the melting peak, the enthalpy was found to be nearly zero which is the same as that in the case of cooling step where no crystallization peak was observed. Although the behavior is complex, the tendency of POSS OAA at 50% loading is towards reduction of PEO crystallization because the melting peak is relatively smaller than that of neat F108. As is the case with BHCA. POSS OAA caused an increase in the $T_g$ of PEO and a suppression of crystallization, which indicates good dispersion of POSS OAA in the PEO phase.

Table 1 shows domain spacing (d) and morphologies of exemplary blends. The Pluronic surfactant was F108 except for the last 3 entries for which the respective Pluronic surfactant is provided.

TABLE 1

| System | d [nm] | Morphology |
| --- | --- | --- |
| Neat F108 | — | disordered |
| 30% BHCA | 14.2 | cylindrical |
| 40% BHCA | 12.8 | spherical |
| 50% BHCA | 12.9 | spherical |
| 30% Benzene-1,2,3,4,5,6-hexol | 13.1 | cylindrical |
| 25% 3,5-Bis(4-aminophenoxy)benzoic acid | 12.7 | spherical |
| 50% POSS OAA | 16.1 | cylindrical |
| 55% POSS OAA | 16.0 | Unclear |
| 65% POSS OAA | 14.5 | spherical |
| 70% POSS OAA | 14.2 | spherical |
| 80% POSS OAA | 15.1 | spherical |
| 50% POSS OAA in F88 | 14.0 | cylindrical |
| 50% POSS OAA in F68 | — | disordered |
| 50% POSS OAA in P105 | 13.4 | lamellar |

Example 1

PS-PEO+POSS OAA

Figure 6:
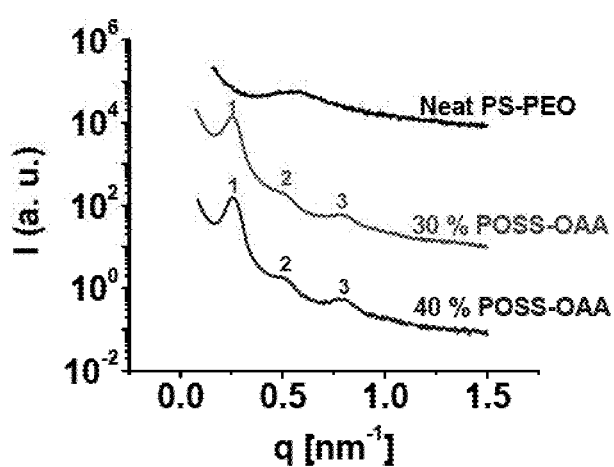
FIG. 6 shows SAXS profiles of neat PS-PEO (3.8 kg/mol-4.8 kg/mol) and its blend with POSS-OAA at 80° C. POSS-OAA is incorporated in PS-PEO as demonstrated by the accompanied disorder to order transition.
Figure 6:
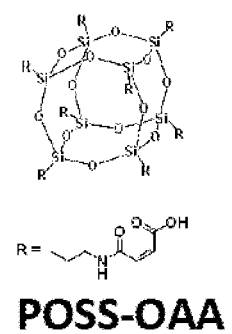

PS-PEO (PS=3.8 kg/mol and PEO=4.8 kg/mol) is disordered when in neat form. Upon incorporation of 30 (w/w) % and 40 (w/w) % POSS octa amic acid the blends formed well ordered morphologies. FIG. 6 shows the scattering profiles measured at 80° C. representing this behavior of disorder-to-order transition.

Example 2

PS-PEO+POSS OAP

Figure 7:
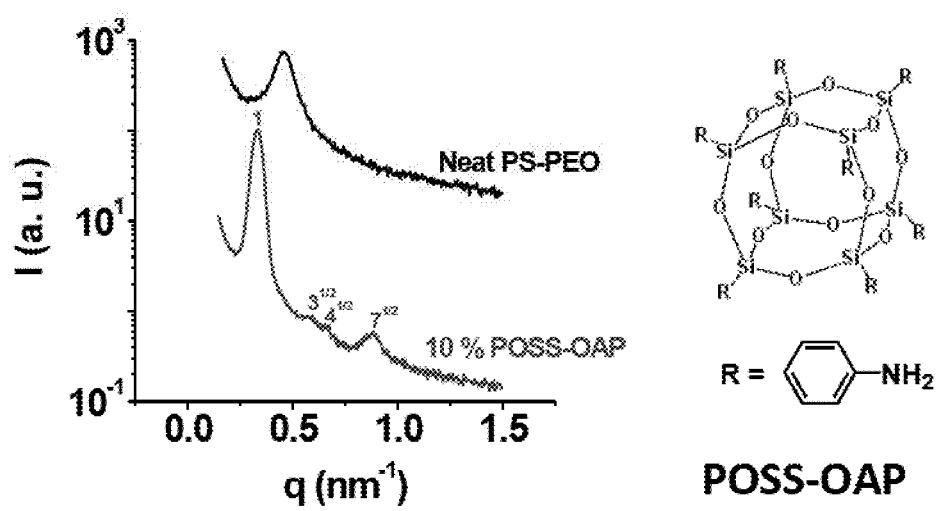
FIG. 7 shows SAXS profiles of neat PS-PEO (PS=9.5 kg/mol, PEO=5 kg/mol) and its blend with POSS-OAP (OAP=octa aminophynyl) at 80° C. POSS-OAP is incorporated in PS-PEO as demonstrated by the accompanied increase in segregation and shift in domain spacing.

PS-PEO (PS=9.5 kg/mol and PEO=5 kg/mol) is phase segregated but not well ordered as indicated by formation of a primary peak but no higher order peaks in the SAXS profile in FIG. 7. Upon incorporation of 10 (w/w) % POSS octa aminophynyl (POSS OAP) the resulting blend formed well ordered cylindrical morphology as also shown in FIG. 7. Compared to neat PS-PEO, the increase in domain spacing for the case of the blend indicates molecular incorporation of POSS OAP.

Example 3

F108+Si NPs functionalized with Allyl Amine Groups (Nanoparticles Abbreviated as Si—R—NH$_2$)

Figure 8:
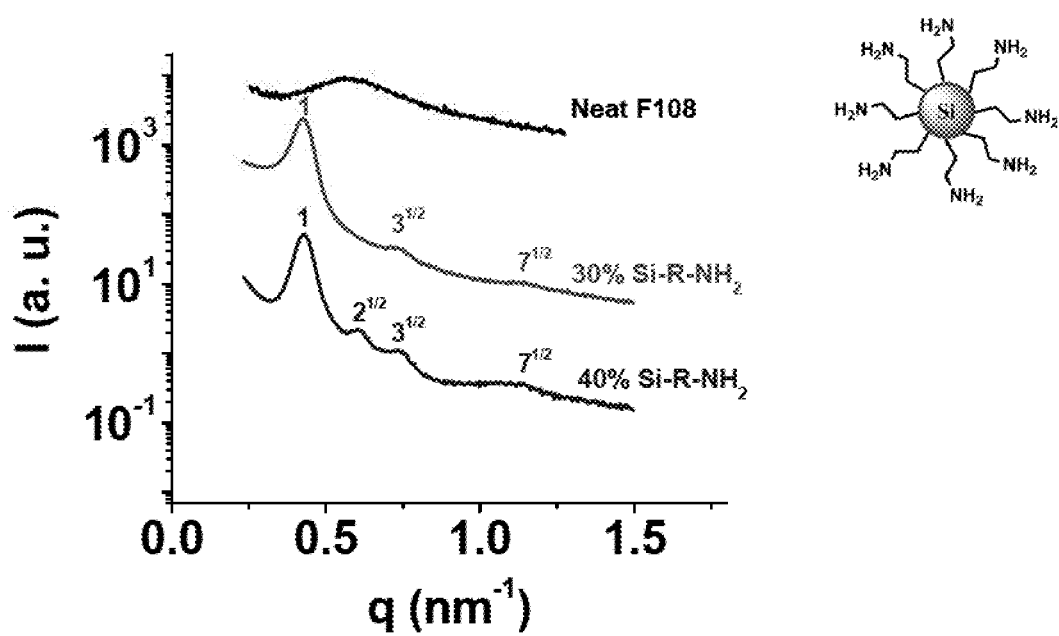
FIG. 8 shows SAXS profiles of neat F108 and its blend with Si—R—NH$_2$ nanoparticles at 80° C.

FIG. 8 shows the SAXS profiles of neat F108 and its blend with Si nanoparticles containing allylamine ligands. F108 is disordered as indicated by a broad peak, a characteristic signature of disordered block copolymers (Leibler, L. *Macromolecules* 1980, 13, 1602-1617). On the other hand, ordering is induced when Si-allyamine nanoparticles are blended in F108. Figure shows that blending 30 (w/w) % lead to formation of cylindrical morphology while blending 40 (w/w) % lead to formation of spherical morphology. Multiple higher order peaks indicate formation of well ordered morphologies.

Figure 9:
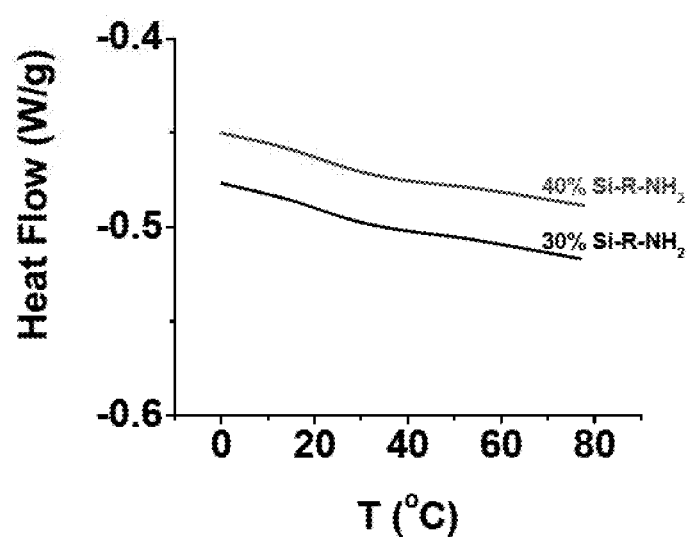
FIG. 9 shows DSC thermograms of blends of F108 and Si—R—NH$_2$ nanoparticles.

DSC thermograms shown in the FIG. 9 below indicate that the crystallization of PEO was completely quenched due to strong interaction with the nanoparticle ligands and the glass transition temperature was found to be around 20.6° C.

Example 4

Figure 10:
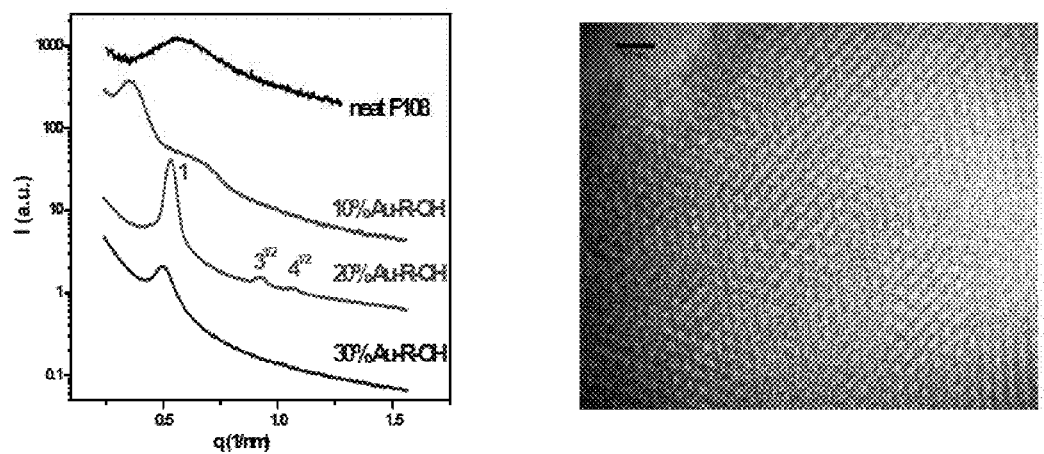
FIG. 10 shows (a) SAXS profiles of neat F108 and its blend with Au-thiophenol nanoparticles at 80° C. (b) TEM micrograph showing Au nanoparticles loaded into the majority domain of the 20% nanoparticle/F108 blend.

FIG. 10a shows the SAXS profiles of neat F108 and its blend with Au nanoparticles functionalized with thiophenol. F108 is disordered as indicated by a broad peak, a characteristic signature of disordered block copolymers (Leibler, L. *Macromolecules* 1980, 13, 1602-1617). On the other hand, ordering is induced when Au-thiophenol nanoparticles are blended in F108. FIG. 10a shows that blending 20 (w/w) % lead to formation of cylindrical. Multiple higher order peaks indicate formation of well ordered morphologies. FIG. 10b is a TEM micrograph showing Au nanoparticles loaded into the majority domain of the 20% nanoparticle/F108 blend.

Example 5

Figure 11:
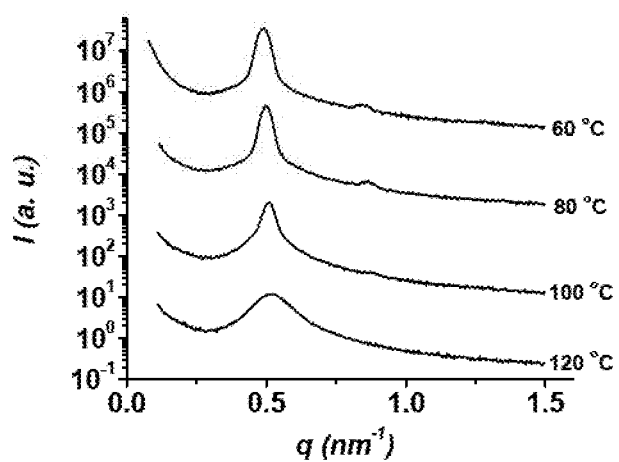
FIG. 11 shows SAXS profiles of 10% BHCA blend in F108 at varying temperatures.
Figure 12:
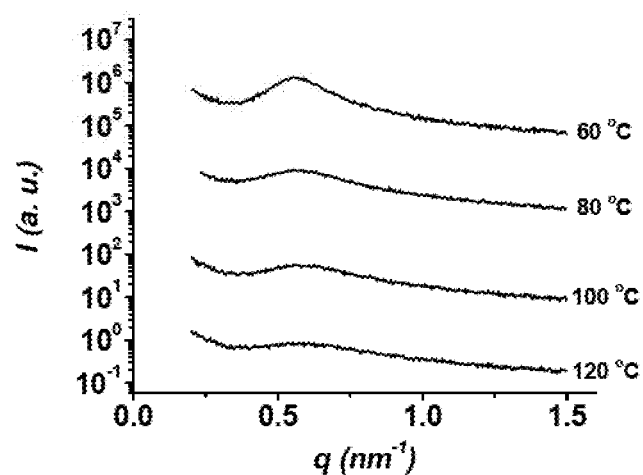
FIG. 12 shows SAXS profiles of neat F108 at varying temperatures.

Order-to-Disorder Transitions as a Result of Decrease in Hydrogen Bond Strength Due to Increase in Temperature for the Case of F108 Blended with 10 (w/w) % BHCA FIG. 11 shows the SAXS profiles of 10% BHCA blend in F108 between 60° C. to 120° C. While the blend is ordered up to 100° C. it is disordered at 120° C. implying that the ODT temperature lies in between 100° C. and 120° C. Thus, weakening the hydrogen bond strength between the additive and PEO chains by increasing the temperature causes an ODT. FIG. 12 shows the SAXS profiles of neat F108 between the same temperature range is incorporated for comparison. Data indicates that F108 is disordered in the entire temperature range as expected of block copolymers above their ODT temperature.

Incorporation By Reference

References and citations to other documents, such as patents, patent applications, patent publications, journals, books, papers, web contents, have been made in this disclosure. All such documents are hereby incorporated herein by reference in their entirety for all purposes.

Equivalents

The representative examples which follow are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance which can be adapted to the practice of this invention in its various embodiments and equivalents thereof.

What is claimed is:

1. A composition comprising:
    a block copolymer wherein a block comprises a hydrogen bond donor or a hydrogen bond acceptor; and
    a pre-formed non-polymeric additive comprising an inorganic core and one or more organic functional groups that comprise a hydrogen bond acceptor or a hydrogen bond donor,
    wherein the pre-formed non-polymeric additive and the copolymer are associated by hydrogen bonds formed therebetween such that the resulting copolymer-additive composite exhibits a more ordered nanostructure than in the absence of the pre-formed non-polymeric additive,
    wherein the copolymer is a tri-block copolymer comprising a poly(propylene oxide) block and a poly(ethylene oxide) block, and
    wherein the pre-formed non-polymeric additive comprises an amino, phenol or carboxylic acid group.

2. The composition of claim 1, wherein the pre-formed non-polymer additive comprises a nanoparticle capable of hydrogen-bonding.

3. The composition of claim 1, wherein the pre-formed non-polymer additive comprises a fullerene functionalized with organic groups capable of hydrogen bonding.

4. The composition of claim 1, wherein the pre-formed non-polymer additive comprises a poly(oligosilsesquioxane) functionalized with organic groups capable of hydrogen bonding.

5. The composition of claim 1, wherein the pre-formed non-polymeric additive comprises two carboxylic acid groups.

6. An ordered copolymer blend composition with periodic nanostructures, the copolymer blend being obtained in bulk quantity from a composition comprising a block copolymer and a pre-formed non-polymeric additive, wherein the pre-formed non-polymeric additive comprising an inorganic core with a plurality of hydrogen bonding sites thereon capable of forming hydrogen bonding with the block copolymer,
    wherein the copolymer is a tri-block copolymer comprising a poly(propylene oxide) block and a poly(ethylene oxide) block, and
    wherein the pre-formed non-polymeric additive comprises an amino, phenol or carboxylic acid group.

7. The composition of claim 6, wherein the pre-formed non-polymeric additive comprises a nanoparticle capable of hydrogen-bonding.

8. The composition of claim 6, wherein the pre-formed non-polymeric additive comprises a fullerene functionalized with organic groups capable of hydrogen bonding.

9. A composition comprising:
    a block copolymer wherein a block comprises a hydrogen bond donor or a hydrogen bond acceptor; and
    a fullerene compound or derivative functionalized with one or more hydrogen bond donor or acceptor groups,
    wherein the fullerene compound and the block copolymer are associated by hydrogen bonds formed therebetween so as to result in an ordered nanostructure,
    wherein the copolymer is a tri-block copolymer comprising a poly(propylene oxide) block and a poly(ethylene oxide) block.

10. The composition of claim 9 wherein the fullerene compound comprises an amino group, a phenol group, or a carboxylic acid group.

* * * * *